(12) United States Patent
Suzuki

(10) Patent No.: US 10,309,327 B2
(45) Date of Patent: Jun. 4, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Tatsuaki Suzuki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 15/875,255

(22) Filed: Jan. 19, 2018

(65) Prior Publication Data

US 2018/0209363 A1    Jul. 26, 2018

(30) Foreign Application Priority Data

Jan. 24, 2017  (JP) ................. 2017-010739

(51) Int. Cl.

| F01N 3/10 | (2006.01) |
|---|---|
| F01N 9/00 | (2006.01) |
| F02P 9/00 | (2006.01) |
| F02D 41/00 | (2006.01) |
| F02D 41/02 | (2006.01) |
| F02D 41/12 | (2006.01) |
| F02D 41/14 | (2006.01) |
| F02D 41/26 | (2006.01) |

(52) U.S. Cl.
CPC ........... *F02D 41/025* (2013.01); *F01N 3/101* (2013.01); *F01N 9/00* (2013.01); *F02D 41/123* (2013.01); *F02D 41/1454* (2013.01); *F02P 9/002* (2013.01); *F01N 2430/06* (2013.01); *F01N 2900/1402* (2013.01); *F01N 2900/1602* (2013.01); *F02D 41/008* (2013.01); *F02D 41/26* (2013.01); *F02D 2200/0802* (2013.01); *Y02T 10/22* (2013.01); *Y02T 10/26* (2013.01); *Y02T 10/47* (2013.01)

(58) Field of Classification Search
CPC ........... F02D 41/025; F02D 2041/0022; F02D 37/02; F02D 41/0005; F02D 41/0007; F02D 41/0087; F02D 41/029; F02D 41/12; F02D 2200/0802; F02D 41/008; F02D 41/123; F02D 41/1454; F02D 41/26

See application file for complete search history.

(56) References Cited

FOREIGN PATENT DOCUMENTS

JP    2012-57492 A    3/2012

*Primary Examiner* — Audrey K Bradley
*Assistant Examiner* — Anthony Ayala Delgado
(74) *Attorney, Agent, or Firm* — Oliff PLC

(57) ABSTRACT

A control device for an internal combustion engine includes an electronic control unit. The electronic control unit is configured to execute temperature rise processing in which a temperature of a catalyst is raised by an air-fuel ratio of at least one of a plurality of cylinders being controlled to a rich air-fuel ratio, an air-fuel ratio of each of the other cylinders being controlled to a lean air-fuel ratio, and a fuel being ignited, and allow the temperature rise processing to continue, by allowing the fuel injection to continue while prohibiting the ignition of the fuel, in a case where the fuel cut request is present and the temperature of the catalyst is equal to or higher than the threshold during the execution of the temperature rise processing.

3 Claims, 3 Drawing Sheets

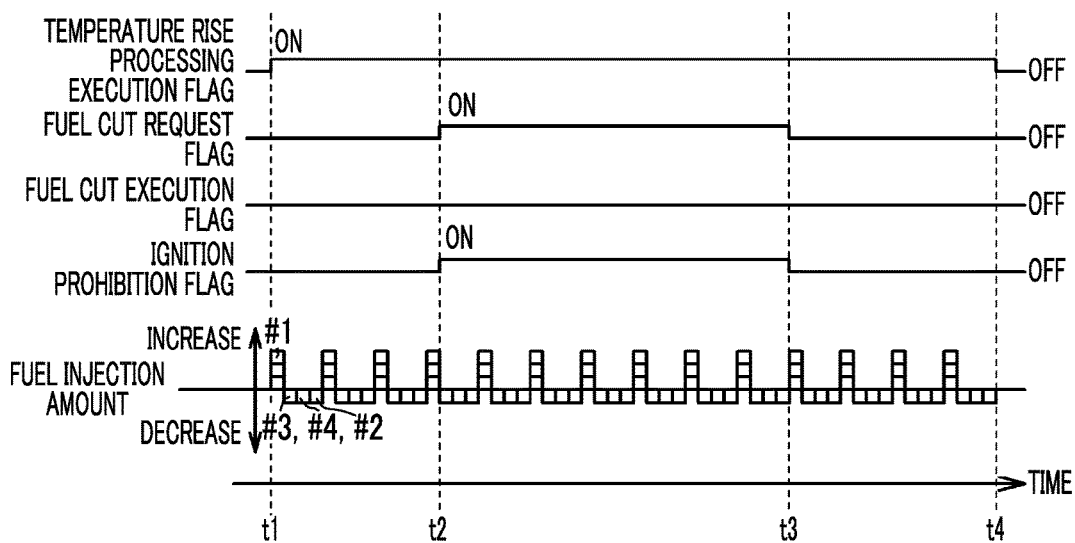
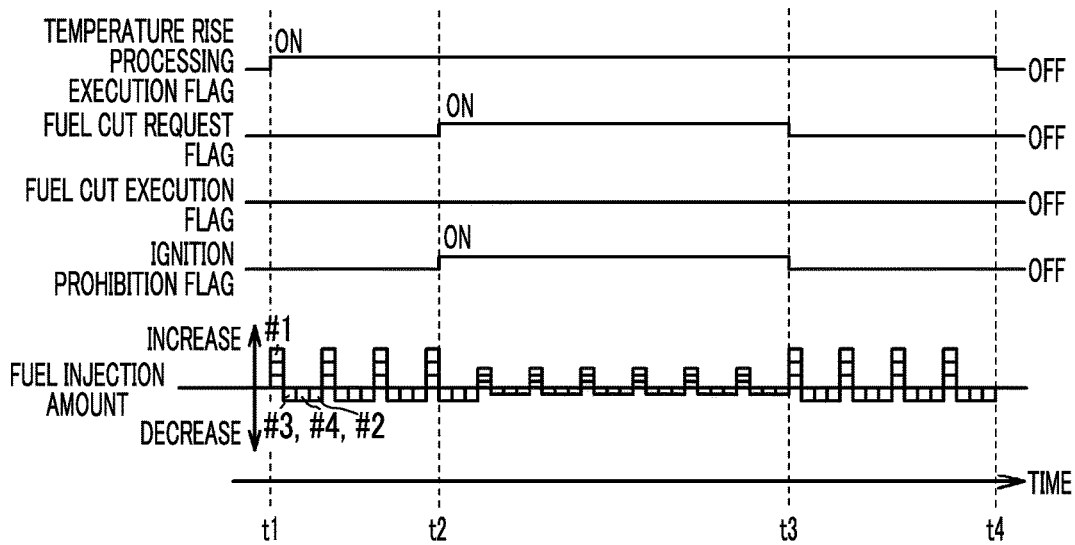

CONTROL DEVICE FOR INTERNAL COMBUSTION ENGINE

INCORPORATION BY REFERENCE

The disclosure of Japanese Patent Application No. 2017-010739 filed on Jan. 24, 2017 including the specification, drawings and abstract is incorporated herein by reference in its entirety.

BACKGROUND

1. Technical Field

The disclosure relates to a control device for an internal combustion engine.

2. Description of Related Art

Temperature rise processing in which the temperature of a catalyst is raised by the air-fuel ratio of one of a plurality of cylinders of an internal combustion engine being controlled to a rich air-fuel ratio and the air-fuel ratio of each of the other cylinders being controlled to a lean air-fuel ratio is known (refer to, for example, Japanese Unexamined Patent Application Publication No. 2012-057492 (JP 2012-057492 A)).

SUMMARY

Fuel injection of the internal combustion engine is stopped once fuel cut is executed during the execution of the temperature rise processing. Accordingly, intake air alone passes through the catalyst with no fuel supplied to the catalyst, and then the temperature of the catalyst may fall.

The disclosure provides a control device for an internal combustion engine that is capable of suppressing a decline in the temperature of a catalyst in a case where a fuel cut request is present.

An aspect of the disclosure relates to a control device for an internal combustion engine. The control device includes an electronic control unit. The electronic control unit is configured to execute temperature rise processing in which a temperature of a catalyst cleaning exhaust gas from a plurality of cylinders of the internal combustion engine is raised by an air-fuel ratio of at least one of the cylinders being controlled to a rich air-fuel ratio lower than a stoichiometric air-fuel ratio, an air-fuel ratio of each of the other cylinders being controlled to a lean air-fuel ratio higher than the stoichiometric air-fuel ratio, and a fuel being ignited, determine whether or not the execution of the temperature rise processing is ongoing, determine whether or not a fuel cut request for stopping fuel injection of the internal combustion engine is present during the execution of the temperature rise processing, determine whether or not a parameter correlating with the temperature of the catalyst indicates that the temperature of the catalyst is equal to or higher than a threshold, and allow the temperature rise processing to continue, by allowing the fuel injection to continue while prohibiting the ignition of the fuel, in a case where the fuel cut request is present and the temperature of the catalyst is equal to or higher than the threshold during the execution of the temperature rise processing.

According to the aspect of the disclosure, the fuel injection continues with the ignition of the fuel prohibited in a case where the fuel cut request is present and the temperature of the catalyst is equal to or higher than the threshold during the execution of the temperature rise processing. Accordingly, unignited and uncombusted fuel is supplied to the catalyst and is combusted around the catalyst by the temperature of the catalyst. Accordingly, the temperature rise processing continues and a decline in the temperature of the catalyst is suppressed even in a case where the fuel cut request is present.

In the control device according to the aspect of the disclosure, the electronic control unit may be configured to execute the temperature rise processing such that a difference between the rich air-fuel ratio and the lean air-fuel ratio is smaller in a case where the ignition of the fuel is prohibited than in a case where the ignition of the fuel is executed.

In the control device according to the aspect of the disclosure, the electronic control unit may be configured to execute fuel cut with the temperature rise processing prohibited in a case where the parameter indicates that the temperature of the catalyst is lower than the threshold.

According to the aspect of the disclosure, a control device for an internal combustion engine that is capable of suppressing a decline in the temperature of a catalyst in a case where a fuel cut request is present can be provided.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a time chart showing a case where temperature rise processing continues; and FIG. 4 is a time chart showing a case where temperature rise processing according to a modification example continues.

DETAILED DESCRIPTION OF EMBODIMENTS

Figure 1:
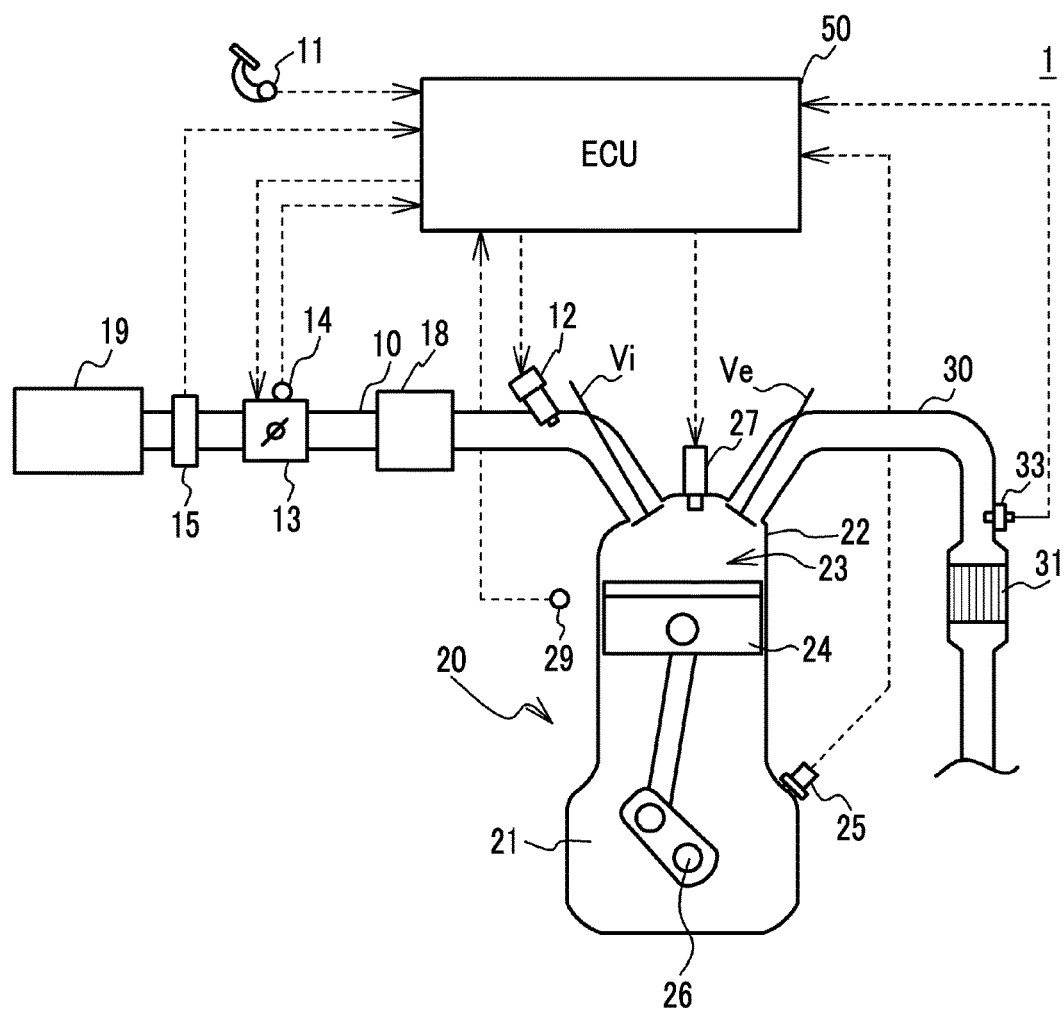
FIG. 1 is a schematic configuration diagram of an engine system.

FIG. 1 is a schematic configuration diagram of an engine system 1. An engine 20 as a power source for traveling is mounted in the engine system 1. A three-way catalyst 31 cleaning exhaust gas from the engine 20 is also mounted in the engine system 1. A piston 24 in the engine 20 reciprocates as an air-fuel mixture is combusted in a combustion chamber 23 of a cylinder head 22 disposed in the upper portion of a cylinder block 21. The engine 20 is an example of an internal combustion engine and an in-line four-cylinder engine that has four cylinders. However, the engine 20 is not limited thereto insofar as it has a plurality of cylinders.

An intake valve Vi opening and closing an intake port and an exhaust valve Ve opening and closing an exhaust port are disposed for each cylinder in the cylinder head 22 of the engine 20. An ignition plug 27 for igniting the air-fuel mixture in the combustion chamber 23 is attached for each cylinder to the top portion of the cylinder head 22.

The intake port of each cylinder is connected to a surge tank 18 via a branch pipe for each cylinder. An intake pipe 10 is connected to the upstream side of the surge tank 18. An air cleaner 19 is disposed at the upstream end of the intake pipe 10. On the intake pipe 10, an air flow meter 15 for intake air amount detection and an electronically controlled throttle valve 13 are disposed in this order from the upstream side of the intake pipe 10.

A fuel injection valve 12 for fuel injection into the intake port is installed at the intake port of each cylinder. The fuel that is injected from the fuel injection valve 12 forms the air-fuel mixture by being mixed with intake air. The air-fuel mixture is suctioned into the combustion chamber 23 when the intake valve Vi is opened. Then, the air-fuel mixture is compressed by the piston 24, ignited by the ignition plug 27, and combusted. A fuel injection valve directly injecting a fuel into a cylinder may be disposed in place of the fuel injection valve 12 that injects the fuel into the intake port. Alternatively, both a fuel injection valve that injects a fuel into a cylinder and the fuel injection valve that injects the fuel into the intake port may be provided at the same time.

The exhaust port of each cylinder is connected to an exhaust pipe 30 via a branch pipe for each cylinder. The three-way catalyst 31 is disposed on the exhaust pipe 30. The three-way catalyst 31 has an oxygen storage capacity and removes NOx, HC, and CO. In the three-way catalyst 31, one or a plurality of catalyst layers including a catalyst carrier such as alumina ($Al_2O_3$) and a catalyst metal carried on the catalyst carrier such as platinum (Pt), palladium (Pd), and rhodium (Rh) is formed on a base material such as cordierite, a honeycomb substrate in particular. The three-way catalyst 31 is an example of a catalyst cleaning the exhaust gas that is discharged from the cylinders of the engine 20. The three-way catalyst 31 may be an oxidation catalyst or a gasoline particulate filter coated with an oxidation catalyst.

An air-fuel ratio sensor 33 for detecting the air-fuel ratio of the exhaust gas is installed on the upstream side of the three-way catalyst 31. The air-fuel ratio sensor 33 is a so-called wide-area air-fuel ratio sensor capable of continuously detecting an air-fuel ratio over a relatively wide range. The air-fuel ratio sensor 33 outputs a signal of a value proportional to the air-fuel ratio.

The engine system 1 is provided with an electronic control unit (ECU) 50. The ECU 50 is provided with a central processing unit (CPU), a random access memory (RAM), a read-only memory (ROM), a storage device, and so on. The ECU 50 controls the engine 20 by executing a program stored in the ROM or the storage device. The ECU 50 is an example of a control device for the engine 20. In addition, the ECU 50 executes predetermined control (described later). The control is realized by a temperature rise processing unit, a temperature rise processing determination unit, a fuel cut request determination unit, a catalyst temperature determination unit, and a fuel cut execution unit of the ECU 50 functionally realized by the CPU, the ROM, and the RAM. Details thereof will be described later.

The ignition plug 27, the throttle valve 13, the fuel injection valve 12, and so on are electrically connected to the ECU 50. In addition, an accelerator operation amount sensor 11 for accelerator operation amount detection, a throttle opening degree sensor 14 detecting the throttle opening degree of the throttle valve 13, the air flow meter 15 for intake air amount detection, the air-fuel ratio sensor 33, a crank angle sensor 25 detecting the crank angle of a crankshaft 26, a coolant temperature sensor 29 detecting the temperature of a coolant for the engine 20, and various other sensors are electrically connected to the ECU 50 via an A/D converter (not illustrated) and so on. The ECU 50 performs ignition timing control, fuel injection amount control, fuel injection timing control, throttle opening degree control, and so on and controls the ignition plug 27, the throttle valve 13, the fuel injection valve 12, and so on based on the values that are detected by the various sensors and the like so that a desired output is obtained.

Target air-fuel ratio setting by the ECU 50 will be described below. A target air-fuel ratio is set in accordance with the state of the engine 20. A stoichiometric air-fuel ratio is set as the target air-fuel ratio in a stationary and non-transient normal operation state. Once the target air-fuel ratio is set, feedback control is performed on the amount of fuel injection into each cylinder such that the air-fuel ratio that is detected by the air-fuel ratio sensor 33 corresponds to the target air-fuel ratio.

In addition, the ECU 50 executes temperature rise processing for the temperature of the three-way catalyst 31 to rise up to an activation temperature at which the three-way catalyst 31 is activated and a regeneration temperature at which the sulfur compound (SOx) that is deposited in the three-way catalyst 31 is desorbed. Specifically, the ECU 50 is an example of the temperature rise processing unit that executes the temperature rise processing in which the temperature of the three-way catalyst 31 cleaning the exhaust gas from the cylinders is raised by the air-fuel ratio of at least one of the cylinders of the engine 20 being controlled to a rich air-fuel ratio lower than the stoichiometric air-fuel ratio, the air-fuel ratio of each of the other cylinders being controlled to a lean air-fuel ratio higher than the stoichiometric air-fuel ratio, and the fuel being ignited. The temperature rise processing is also referred to as dither control. In the present example, among the cylinders #1 to #4, the air-fuel ratio of the cylinder #1 is controlled to the rich air-fuel ratio lower than the stoichiometric air-fuel ratio and the air-fuel ratio of each of the cylinders #2 to #4 is controlled to the lean air-fuel ratio higher than the stoichiometric air-fuel ratio.

Specifically, the air-fuel ratio control during the temperature rise processing is to control the air-fuel ratio of the cylinder #1 to the rich air-fuel ratio by performing increase correction such that the air-fuel ratio exceeds the fuel injection amount corresponding to the target air-fuel ratio by a predetermined ratio and to control the air-fuel ratio of each of the cylinders #2 to #4 to the lean air-fuel ratio by performing decrease correction such that the air-fuel ratio falls short of the fuel injection amount corresponding to the target air-fuel ratio by a predetermined ratio. In a case where the increase/decrease ratio is 20%, for example, the air-fuel ratio of the cylinder #1 is controlled to the rich air-fuel ratio by an increase correction of 15% with respect to the fuel injection amount corresponding to the target air-fuel ratio and the air-fuel ratio of each of the cylinders #2 to #4 is controlled to the lean air-fuel ratio by a decrease correction of 5% with respect to the fuel injection amount corresponding to the target air-fuel ratio. By the increase/decrease ratio being specified as described above, the average of the air-fuel ratios of the cylinders #1 to #4 is maintained at the stoichiometric air-fuel ratio. Once the temperature rise processing is executed as described above, the surplus fuel that is discharged from the cylinder #1 controlled to have the rich air-fuel ratio adheres to the three-way catalyst 31 and is combusted under a lean atmosphere by the exhaust gas discharged from the cylinder set to have the lean air-fuel ratio. The temperature of the three-way catalyst 31 is raised as a result. A temperature rise processing execution flag is switched from OFF to ON once the execution of the temperature rise processing is initiated. The increase/decrease ratio is specified in the temperature rise processing such that the average of the air-fuel ratios of the cylinders #1 to #4 is the stoichiometric air-fuel ratio. However, the disclosure is not limited thereto insofar as the average air-fuel ratio is within a predetermined range including the stoichiometric air-fuel ratio and the temperature of the three-way catalyst 31 can be raised.

In some cases, the ECU 50 receives a fuel cut request for stopping the fuel injection to the engine 20. The fuel cut is requested in a case where, for example, the accelerator operation amount becomes zero. The fuel cut is not requested in a case where, for example, the accelerator operation amount becomes greater than zero.

Nothing but the intake air in the engine 20 is supplied to the three-way catalyst 31 once the fuel injection is stopped as a result of the execution of the fuel cut during the execution of the temperature rise processing. Accordingly, the temperature of the three-way catalyst 31 may fall. In this regard, the ECU 50 allows the temperature rise processing to continue, by allowing the fuel injection to continue while prohibiting the ignition of the fuel, in a case where the fuel cut is requested during the execution of the temperature rise processing.

Figure 2:
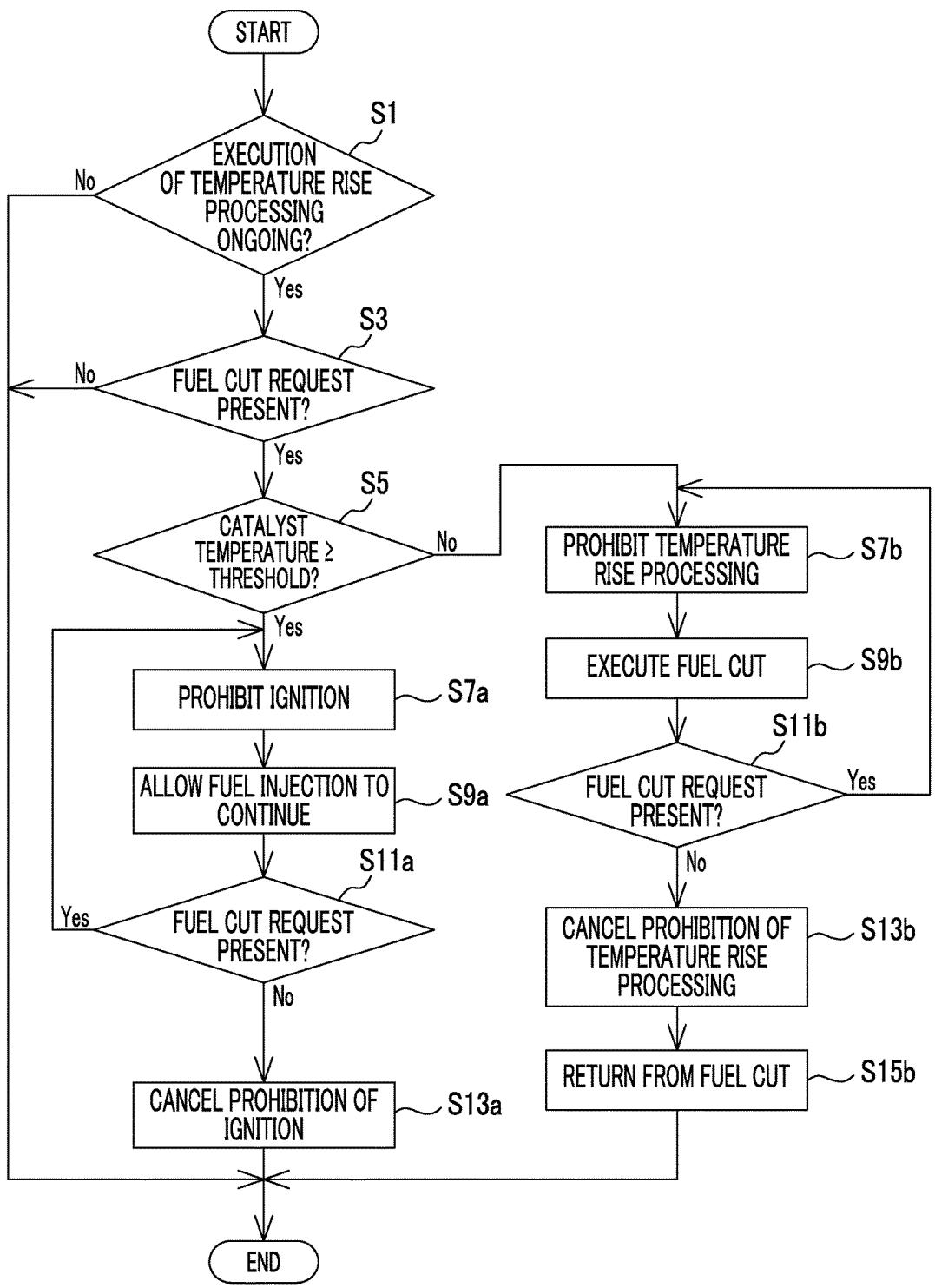
FIG. 2 is a flowchart illustrating an example of control executed by an ECU.

FIG. 2 is a flowchart illustrating an example of the control that is executed by the ECU 50. The control that is illustrated in FIG. 2 is repeatedly executed at predetermined cycles. The ECU 50 determines whether or not the execution of the temperature rise processing is ongoing (Step S1), and this control is terminated in the case of a negative determination. The processing of Step S1 is an example of the processing that is executed by the temperature rise processing determination unit determining whether or not the execution of the temperature rise processing is ongoing.

In the case of a positive determination in Step S1, the ECU 50 determines whether or not the fuel cut request is present (Step S3). Then, this control is terminated in the case of a negative determination. The processing of Step S3 is an example of the processing that is executed by the fuel cut request determination unit determining whether or not the fuel cut request for stopping the fuel injection to the engine is present during the execution of the temperature rise processing.

In the case of a positive determination in Step S3, the ECU 50 determines whether or not the temperature of the three-way catalyst 31 is equal to or higher than a threshold (Step S5). The threshold is a temperature for determining whether or not uncombusted fuel can be combusted by the temperature of the three-way catalyst 31 in a case where the uncombusted fuel is supplied to the three-way catalyst 31 as described later. The temperature of the three-way catalyst 31 may be, for example, estimated based on the load and the rotation speed of the engine 20 or detected by a temperature sensor.

The temperature of the three-way catalyst 31 may not be estimated or detected as described above. For example, in many cases, the temperature of the three-way catalyst 31 falls as the temperature of the coolant for the engine 20 falls. Accordingly, the ECU 50 may determine that cold start of the engine 20 is ongoing and the temperature of the three-way catalyst 31 is lower than the threshold in a case where the temperature of the coolant for the engine 20 is less than a predetermined value and determine that the engine 20 is already warmed up and the temperature of the three-way catalyst 31 is equal to or higher than the threshold in a case where the temperature of the coolant for the engine 20 is greater than the predetermined value. Until a predetermined crank rotation speed is reached after starting of the engine 20 is initiated, the temperature of the three-way catalyst 31 rises as the crank rotation speed following the initiation of the start of the engine 20 increases. Accordingly, the ECU 50 may determine that the three-way catalyst 31 has yet to be completely warmed up and the temperature of the three-way catalyst 31 is lower than the threshold in a case where the crankshaft 26 has yet to reach the predetermined crank rotation speed after the initiation of the start of the engine 20 and determine that the temperature of the three-way catalyst 31 is equal to or higher than the threshold in a case where the crankshaft 26 rotates at the predetermined crank rotation speed or at a higher speed after the initiation of the start of the engine 20. As described above, the temperature of the coolant for the engine 20, the rotation speed of the crankshaft 26 following the initiation of the start of the engine 20, and the like as well as the temperature of the three-way catalyst 31 correspond to parameters correlating with the temperature of the three-way catalyst 31. The processing of Step S5 is an example of the processing that is executed by the catalyst temperature determination unit determining whether or not the parameter correlating with the temperature of the three-way catalyst 31 indicates that the temperature of the three-way catalyst 31 is equal to or higher than the threshold.

In the case of a positive determination in Step S5, the fuel injection continues (Step S9a) with the ignition of the fuel by the ignition plug 27 prohibited (Step S7a). As a result, the fuel is supplied to the three-way catalyst 31 with no fuel combustion occurring in the engine 20, and the fuel is combusted around the three-way catalyst 31 by the temperature of the three-way catalyst 31. In other words, the temperature rise processing continues. Accordingly, a decline in the temperature of the three-way catalyst 31 is suppressed. The air-fuel ratio of each cylinder in the ignition-prohibited state is controlled to the same air-fuel ratio as in the temperature rise processing in an ignition-executed state.

Since the ignition of the fuel is prohibited, the output of the engine 20 does not increase despite the continuation of the fuel injection. Accordingly, the output state of the engine 20 in a case where the fuel cut is executed and the output state of the engine 20 in a case where the temperature rise processing continues without ignition in the presence of the fuel cut request are substantially the same as each other. Accordingly, the temperature rise processing can continue in the output state of the internal combustion engine that responds to the fuel cut request. The processing of Step S7a and the processing of Step S9a are examples of the processing that is executed by the temperature rise processing unit so that the temperature rise processing continues, by the fuel injection continuing with the ignition of the fuel prohibited, in a case where the fuel cut request is present during the execution of the temperature rise processing.

Subsequently, the ECU 50 determines again whether or not the fuel cut request is present (Step S11a). In the case of a positive determination, the processing of Step S7a and the processing of Step S9a continue. In the case of a negative determination, the prohibition of the ignition of the fuel is cancelled (Step S13a). Then, the temperature rise processing entailing the ignition of the fuel is executed insofar as a temperature rise request is present.

In the case of a negative determination in Step S5, the temperature rise processing is prohibited (Step S7b) and the fuel cut is executed (Step S9b). In other words, the fuel injection itself as well as the ignition of the fuel is prohibited. Once processing similar to Step S7a and Step S9a is executed in a state where the temperature of the three-way catalyst 31 is low, the uncombusted fuel may pass through the three-way catalyst 31 without being combusted by the heat of the three-way catalyst 31, and then exhaust emission may deteriorate and the fuel may be wasted. Accordingly, in the present example, the temperature rise processing is prohibited and the fuel cut is executed in a state where the temperature of the three-way catalyst 31 is low as described above, and thus deterioration of exhaust emission and waste of fuel are suppressed. The processing of Step S7b and the processing of Step S9b are examples of the processing that is executed by the fuel cut execution unit so that the temperature rise processing is prohibited and the fuel cut is executed in a case where the temperature of the three-way catalyst 31 is lower than the threshold.

Subsequently, the ECU 50 determines again whether or not the fuel cut request is present (Step S11b). In the case of a positive determination, the processing of Step S7b and the processing of Step S9b continue. In the case of a negative determination, the prohibition of the temperature rise processing is cancelled (Step S13b) and returning from the fuel cut to the normal operation state is performed (Step S15b). In this case, the three-way catalyst 31 is likely to have a low temperature as a result of the execution of the fuel cut, and thus the temperature rise processing entailing the ignition is executed again after the return from the fuel cut.

Hereinafter, a case where the temperature rise processing continues will be described with reference to the time chart that is illustrated in FIG. 3. The temperature rise processing execution flag, a fuel cut request flag, a fuel cut execution flag, an ignition prohibition flag, and the fuel injection amount are illustrated in FIG. 3.

Once the temperature rise processing is executed at time t1, the temperature rise processing execution flag is switched from OFF to ON, the fuel injection amount of the cylinder #1 is controlled to the rich air-fuel ratio through the increase correction, and the fuel injection amount of each of the cylinders #2 to #4 is controlled to the lean air-fuel ratio through the decrease correction. The ignition prohibition flag remains OFF and the temperature rise processing entailing the ignition is executed. The fuel injection is executed in the order of the cylinders #1, #3, #4, #2.

Once the fuel cut request flag is switched from OFF to ON during the execution of the temperature rise processing at time t2, the ignition prohibition flag is switched from OFF to ON with the fuel cut execution flag remaining OFF and the fuel injection continues. In other words, the temperature rise processing entailing no ignition continues and a decline in the temperature of the three-way catalyst 31 is suppressed. The temperature rise processing execution flag remains ON.

Once the fuel cut request flag is switched from ON to OFF at time t3, the ignition prohibition flag is switched from ON to OFF and the temperature rise processing entailing the ignition is executed again. Once the temperature rise processing is stopped at time t4, the temperature rise processing execution flag is switched from ON to OFF.

Hereinafter, a modification example of the temperature rise processing entailing no ignition will be described. In the present modification example, the difference between the rich air-fuel ratio and the lean air-fuel ratio controlled during the temperature rise processing entailing no ignition is controlled such that the difference is less than the difference between the rich air-fuel ratio and the lean air-fuel ratio controlled during the temperature rise processing entailing the ignition. FIG. 4 is a time chart showing a case where the temperature rise processing according to the modification example continues. The increase/decrease ratio of the fuel injection amount for the period of time t2 to time t3 when the temperature rise processing entailing no ignition is executed is lower than the increase/decrease ratio of the fuel injection amount for the period when the execution of the temperature rise processing entailing the ignition is ongoing. For example, the increase and decrease ratios in the temperature rise processing entailing the ignition for the period of time t1 to time t2 and the period of time t3 to time t4 are 15% and 5%, respectively. In contrast, the increase and decrease ratios in the temperature rise processing entailing no ignition for the period of time t2 to time t3 are 7.5% and 2.5%, respectively.

The degree to which the temperature of the three-way catalyst 31 rises is known to tend to decrease as the increase/decrease ratio as the total of the increase ratio and the decrease ratio decreases, that is, as the difference between the rich air-fuel ratio and the lean air-fuel ratio decreases. As the difference between the rich air-fuel ratio and the lean air-fuel ratio decreases, the air-fuel ratio of each cylinder becomes closer to the stoichiometric air-fuel ratio. Accordingly, an excessive rise in the temperature of the three-way catalyst 31 during the execution of the temperature rise processing entailing no ignition is suppressed.

During the temperature rise processing entailing no ignition according to the modification example, the fuel injection continues such that the average of the air-fuel ratios of all of the cylinders reaches the stoichiometric air-fuel ratio. However, the disclosure is not limited thereto. For example, the fuel increase ratio for realizing the rich air-fuel ratio alone may be lower than the increase ratio for the temperature rise processing entailing the ignition or the fuel decrease ratio for realizing the lean air-fuel ratio alone may be lower than the decrease ratio for the temperature rise processing entailing the ignition. In a case where the fuel cut request is present, the output of the engine 20 does not have to be ensured, and thus the air-fuel ratio of each cylinder can be controlled to the rich air-fuel ratio or the lean air-fuel ratio without constraints from the viewpoint of ensuring the output of the engine 20.

In the modification example, time t2 at which the fuel cut request flag and the ignition prohibition flag are switched from OFF to ON is in the middle of one cycle between the injection timings of the cylinders #1, #3 and the increase/decrease ratio is decreased from the cylinder #1 following the termination of the cycle in this case. However, the disclosure is not limited thereto. The increase/decrease ratio in the cylinder where the injection is performed immediately after the fuel cut request flag and the ignition prohibition flag are switched from OFF to ON may be decreased as well.

The disclosure is not limited to the specific examples that have been described in detail above. The disclosure can be modified and altered in various ways within the scope of the disclosure described in the claims.

In the example and the modification example, the rich air-fuel ratio and the lean air-fuel ratio are realized by the increase/decrease correction being performed with respect to the fuel injection amount realizing the target air-fuel ratio during the temperature rise processing. However, the disclosure is not limited thereto. In other words, the target air-fuel ratio of any one of the cylinders may be set to the rich air-fuel ratio and the target air-fuel ratios of the other cylinders may directly be set to the lean air-fuel ratio during the temperature rise processing.

What is claimed is:

1. A control device for an internal combustion engine, the control device comprising an electronic control unit configured to:

execute temperature rise processing in which a temperature of a catalyst cleaning exhaust gas from a plurality of cylinders of the internal combustion engine is raised by an air-fuel ratio of at least one of the cylinders being controlled to a rich air-fuel ratio lower than a stoichiometric air-fuel ratio, an air-fuel ratio of each of the other cylinders being controlled to a lean air-fuel ratio higher than the stoichiometric air-fuel ratio, and a fuel being ignited;

determine whether or not the execution of the temperature rise processing is ongoing;

determine whether or not a fuel cut request for stopping fuel injection of the internal combustion engine is present during the execution of the temperature rise processing;

determine whether or not a parameter correlating with the temperature of the catalyst indicates that the temperature of the catalyst is equal to or higher than a threshold; and allow the temperature rise processing to continue, by allowing the fuel injection to continue while prohibiting the ignition of the fuel, when the fuel cut request is present and the temperature of the catalyst is equal to or higher than the threshold during the execution of the temperature rise processing.

2. The control device according to claim 1, wherein the electronic control unit is configured to execute the temperature rise processing such that a difference between the rich air-fuel ratio and the lean air-fuel ratio is smaller in a case where the ignition of the fuel is prohibited than in a case where the ignition of the fuel is executed.

3. The control device according to claim 1, wherein the electronic control unit is configured to execute fuel cut with the temperature rise processing prohibited in a case where the parameter indicates that the temperature of the catalyst is lower than the threshold.

* * * * *